March 10, 1970    F. REY    3,499,558
LOADING DEVICE
Filed Feb. 21, 1968    5 Sheets-Sheet 2
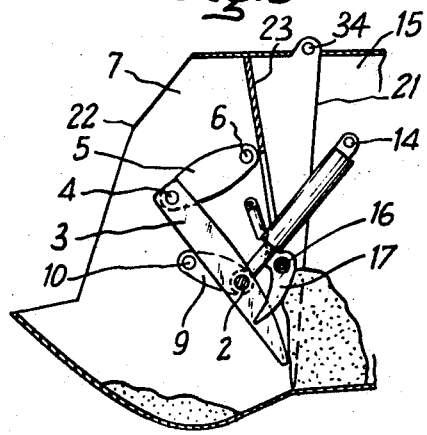
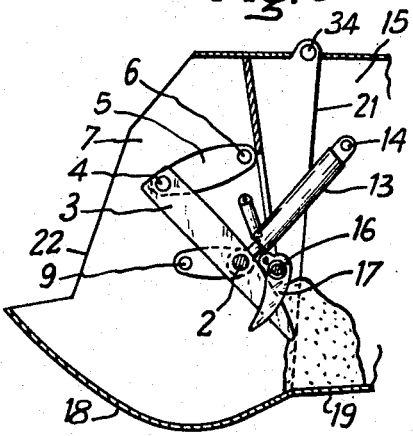
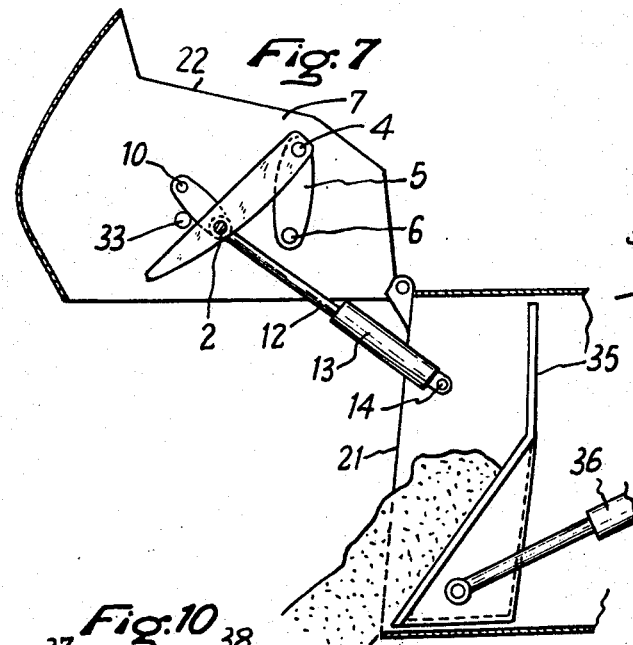
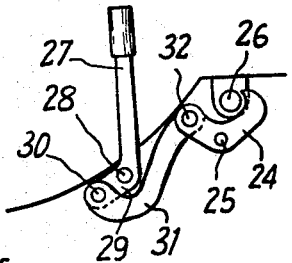
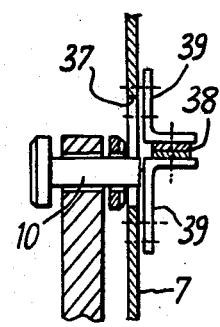
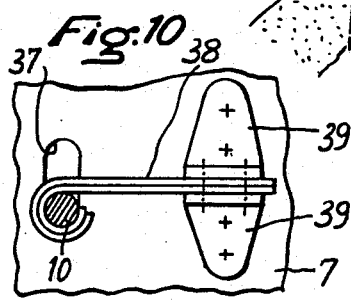
INVENTOR
FERNAND REY
By Linton and Linton
ATTORNEYS

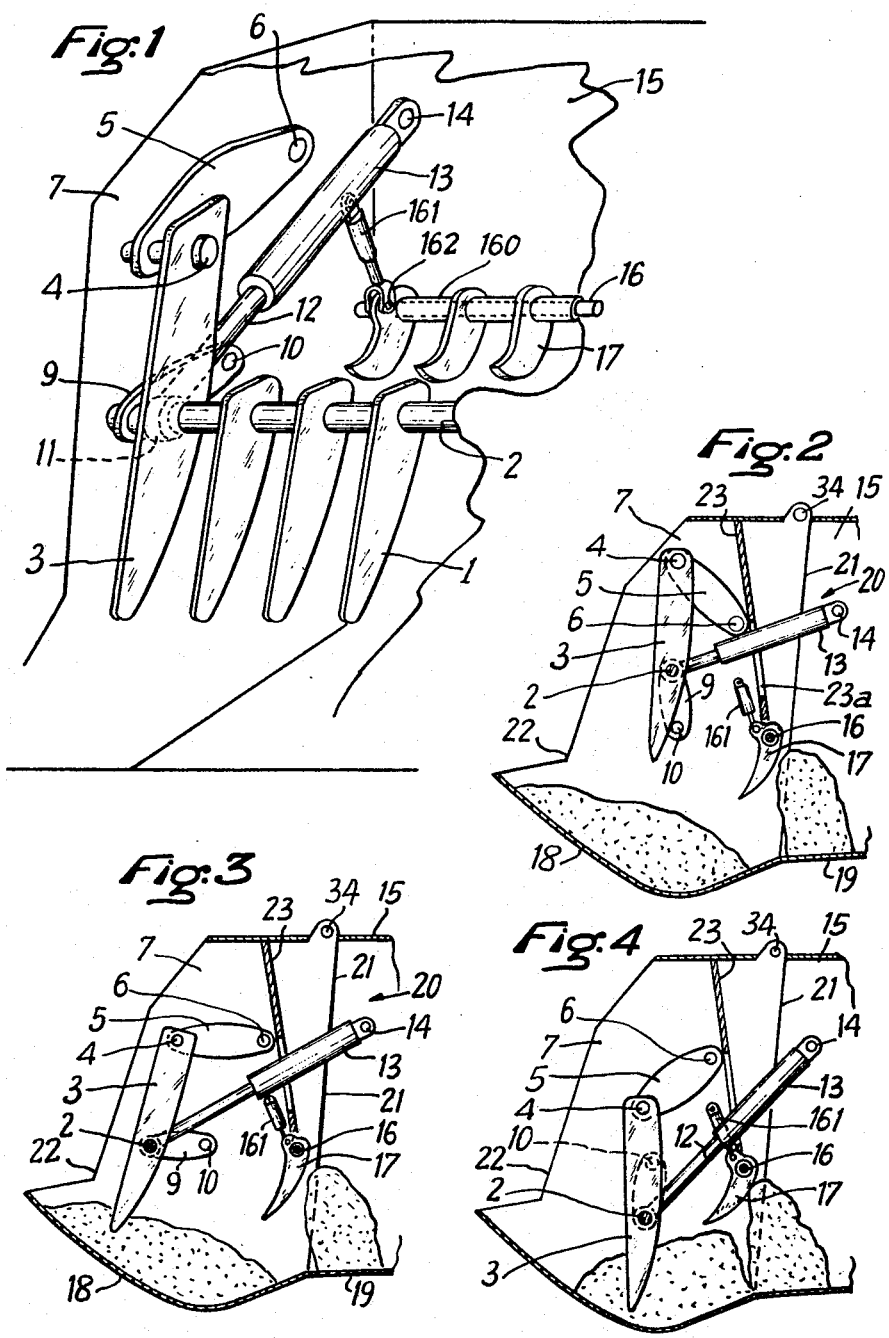

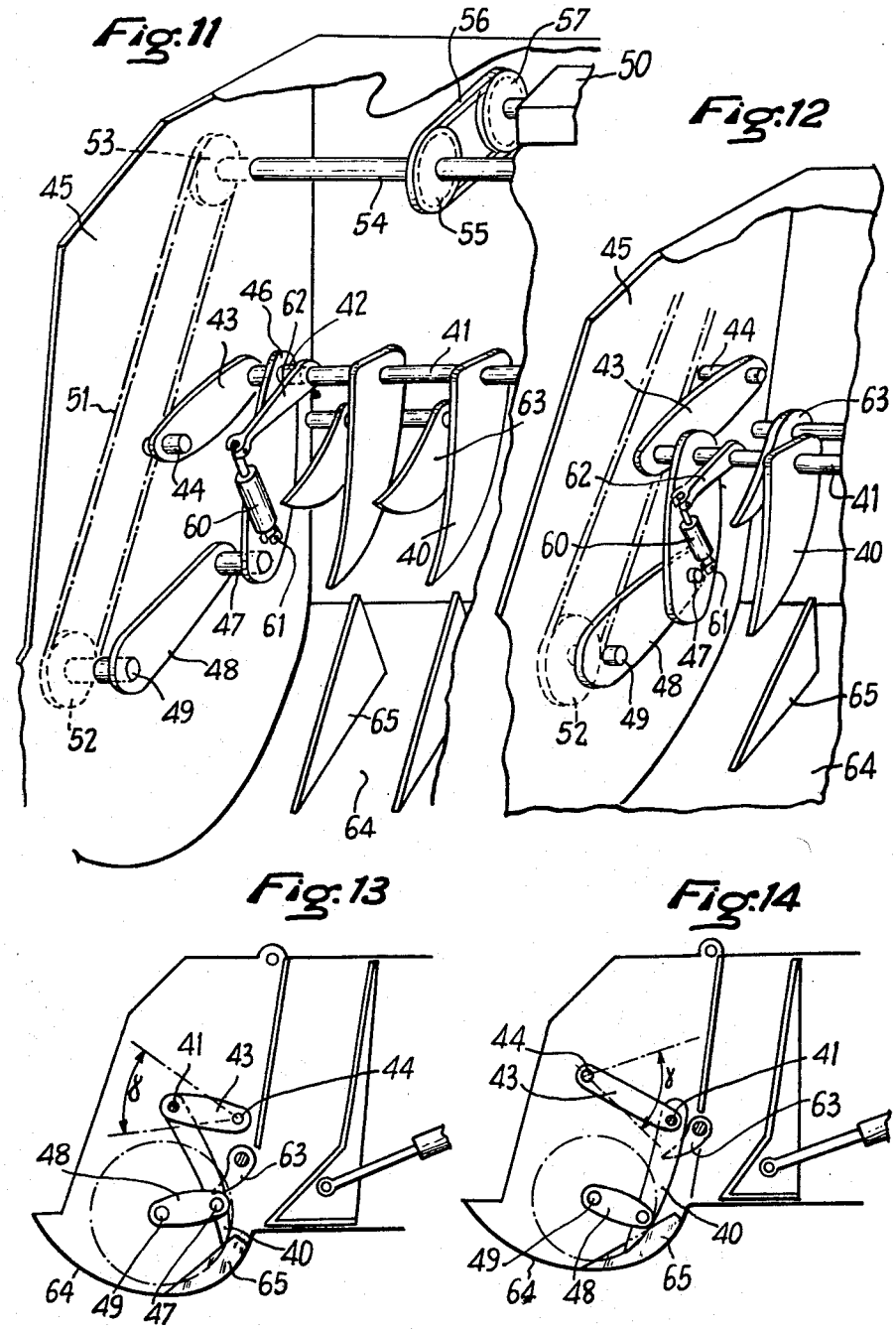

March 10, 1970  F. REY  3,499,558
LOADING DEVICE
Filed Feb. 21, 1968  5 Sheets-Sheet 4

INVENTOR
FERNAND REY
By Linton and Linton
ATTORNEYS

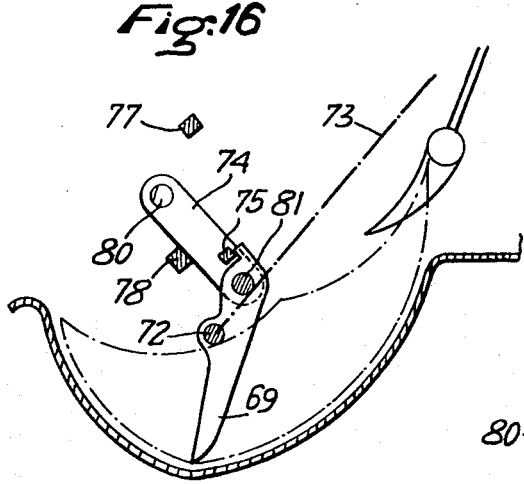
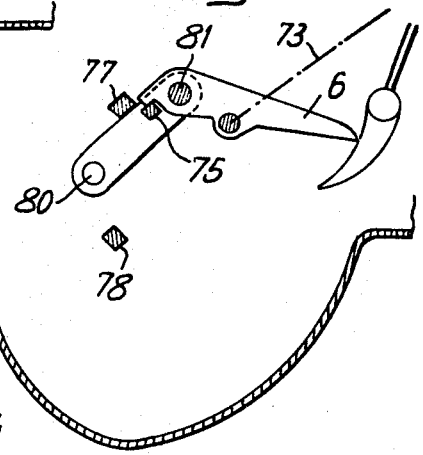
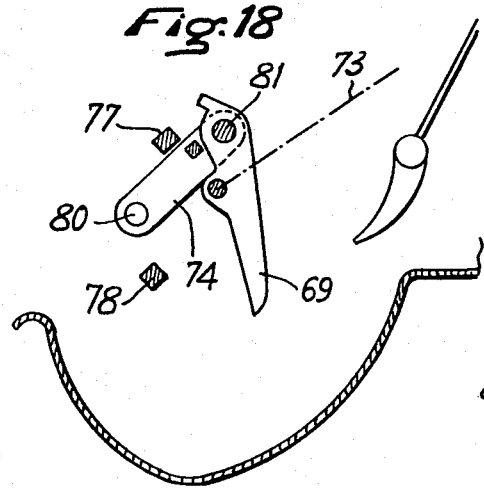
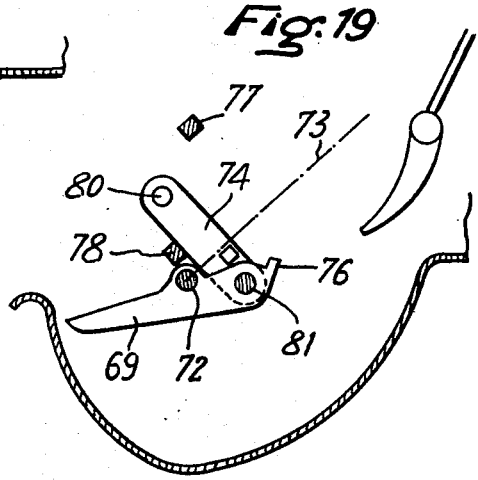

United States Patent Office 3,499,558
Patented Mar. 10, 1970

3,499,558
LOADING DEVICE
Fernand Rey, 2 Rue Antoine Roucher,
75 Paris 16°, France
Filed Feb. 21, 1968, Ser. No. 707,180
Claims priority, application France, Mar. 1, 1967,
97,081
Int. Cl. B65f 1/10
U.S. Cl. 214—83.3                                   6 Claims

ABSTRACT OF THE DISCLOSURE

A set of teeth 1 disposed above a hopper, and connected to the end 4 of a link 5 carried by the lateral wall 7, are moved along a predetermined closed circuit in order to sweep the bottom 18, then to penetrate between the teeth 17 of a fixed or movable comb in an upwards circular motion to permit a cleaning of the said teeth, this motion following up to a maximal height position of the teeth 1 towards the rear of the hopper, for a new cycle.

---

This invention relates to the continuous or intermittent loading of solid, pasty, semi-liquid, pulverulent or heterogeneous products, town refuse, solid wastes of communities, or commercial, industrial wastes, garbage and other wastes of all kinds, into a fixed or movable tank or container.

It is the essential object of this invention to carry out the collection work under the best possible conditions as far as efficiency and rapidity are concerned, while reducing maintenance to a minimum. This invention also permits the easy adaptation of relatively air-tight equipments, possibly with the use of standard containers.

Hitherto known devices of this character which use "drawers" equipped with single or multiple blades, or wheels, are attended by various problems and difficulties concerning the guiding, tightness and useful life of the parts in relative frictional contact. The hopper capacity is limited as well as the absorption rate and the compression of the loaded products or refuse. Finally, the loading capacity of these known devices is not sufficient to absorb for example a thousand gallons per minute. Besides, the inherent mechanisms and motors are a source of considerable noise very detrimental to the proper performance of the loading operation.

With the loading device of this invention the inconveniences set forth hereinabove are avoided in that this device is free of any specific guide means, sealing means, and fragile components.

The receiving vessels are discharged either by dumping the container or by moving its front wall towards its near wall, the means utilized for the loading operation being advantageously used for opening the rear wall and thus permit the discharge of these receiving vessels.

The essential feature characterising the loading device of this invention lies in the fact that the loading member proper consists of a harrow-like structure carrying spindles, needles, prongs or teeth suspended from the upper portion of a loading hopper and driven along a closed circuit with a continuous or intermittent movement ensuring the dipping of said harrow into the refuse or other materials filling the hoppers, and subsequently the movement of said harrow towards the container for delivering the products or materials to be loaded into same, the harrow being raised at the end of its delivery stroke before returning in this raised position to its initial position for repeating the loading cycle.

According to a complementary and important feature of this invention, said spindles, prongs, needles or teeth engage at the end of the delivery movement of the harrow supporting them the intervals formed between the teeth of a fixed or movable comb-like, deflector-forming structure disposed across the inlet aperture of the container for shearing and compressing the products or materials during the upward movement of said harrow through said comb-like structure, so as to cause said harrow and comb to clean each other.

The loading device according to this invention is controlled by means either of piston-and-cylinder units or actuators for lifting the door, or of a hydraulic motor, or by using any other suitable means. In the case of a hydraulic motor the movement thereof is advantageously transmitted via roller chains and sprockets to sets of lateral links from which the harrow is suspended, and in this case the gate or door is raised by means of a pair of lateral actuators independent of the means controlling the loading device.

The amplitude of the harrow movement may be increased by rotatably moving the teeth or prongs of the harrow in relation to the harrow supporting structure. To this end the set of teeth or prongs may be pivotally mounted on the harrow supporting structure suspended from lateral links and the teeth assembly may be actuated from any suitable means independent of the harrow proper.

In order to afford a clear understanding of this invention and of the manner in which the same may be carried out in practice, reference will now be made to the accompanying drawings illustrating diagrammatically by way of example various forms of embodiment of the loading device of this invention. In the drawings:

FIGURE 1 is a perspective view with parts broken away, showing the rear portion of a garbage-hauling vehicle equipped with a harrow actuated by piston-cylinder units;

FIGURES 2 to 6 inclusive illustrate diagrammatically in longitudinal vertical section, the sequence of steps of a closed-circuit movement performed by the harrow of the structure shown in FIGURE 1;

FIGURE 7 is a diagrammatic view showing the opening of the vehicle trap door by using lateral fluid-responsive actuators also controlling the harrow;

FIGURE 8 is a detail view showing an example of manual locking of the rear door;

FIGURE 9 is a section showing the wall supporting a floating suspension system for the harrow;

FIGURE 10 is a side elevational view of the device of FIGURE 9;

FIGURE 11 is a perspective view with parts broken away, showing the rear portion of a refuse-collection vehicle equipped with a harrow actuated by a hydraulic motor;

FIGURE 12 is a perspective view showing a modified form of embodiment of the control means provided in the arrangement of FIGURE 11;

FIGURES 13 and 14 are diagrams illustrating the preceding forms of embodiment and showing kinematic arrangements obtained by different positionings of the link pivot pins;

FIGURES 16 to 19 show various limit positions of the harrow and of its lateral suspension links in the case of a central actuator as shown in FIGURE 15.

Figure 15:
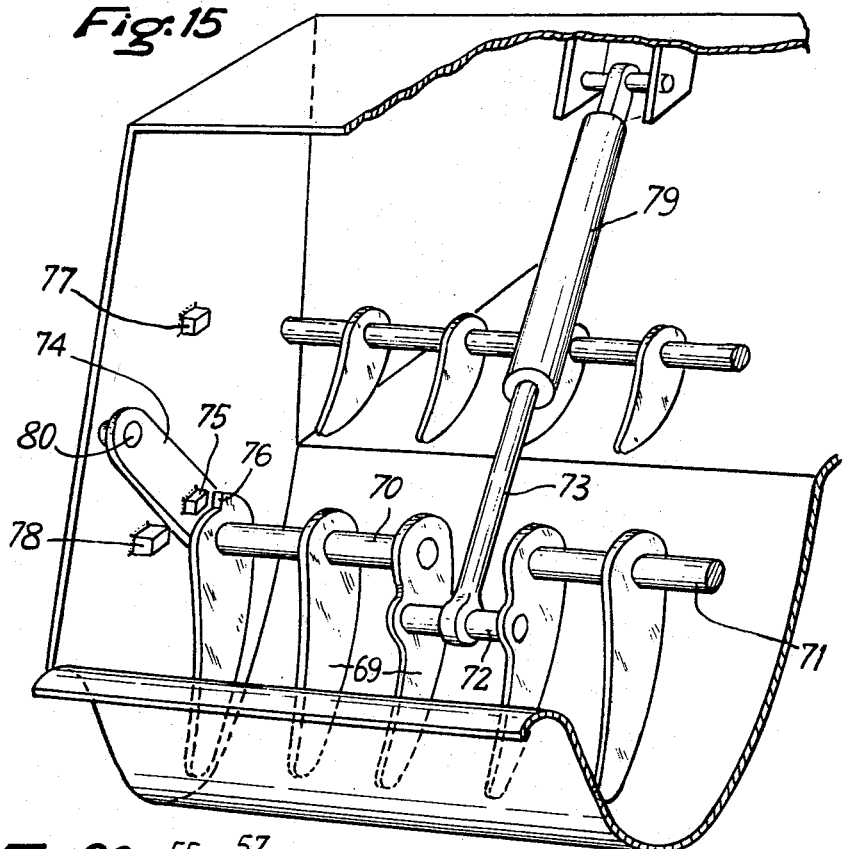
FIGURE 15 is a perspective view with parts broken away, showing an arrangement wherein the harrow is operated by a central actuator.

The loading device illustrated in FIGURES 1 to 6 of the drawings comprises a set of parallel depending teeth 1 rigid with a transverse shaft 2 adapted to be moved along a closed circuit inside the loading hopper. This shaft carries at both ends a similar tooth 3 formed, however, with an upper extension, beyond the shaft 2, having its end pivotally connected by a pin 4 to a link 5. This link 5 is pivotally supported by another pin 6 carried by the lateral wall 7 which may be a lateral wall of the rear door of the container or vehicle. The shaft 2 carries at each end a trunnion 8 beyond the corresponding tooth 3 which is pivotally connected to the end of a link 9 underlying the aforesaid link 5 and suspended from a pivot pin 10 carried by the wall 7. The pivot pins 6 and 10 are of the floating type in that they are flexibly mounted on the wall 7 in a manner to be described presently.

At either end of the shaft 2 extends through a socket 11 carried by the piston rod 12 of a hydraulic actuator having its cylinder 13 suspended from a fixed pivot pin 14 carried by the wall 15 of the vehicle body, ahead of the door.

Figure 1:
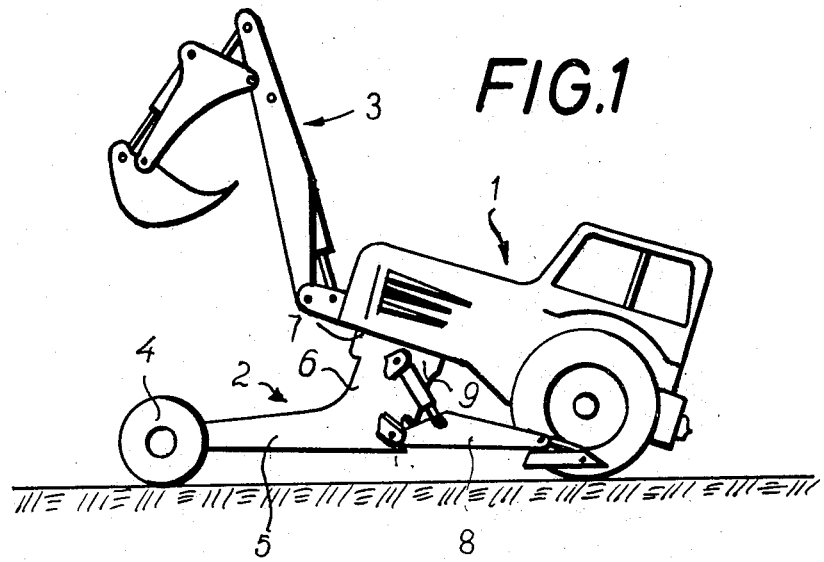
Figure 2:
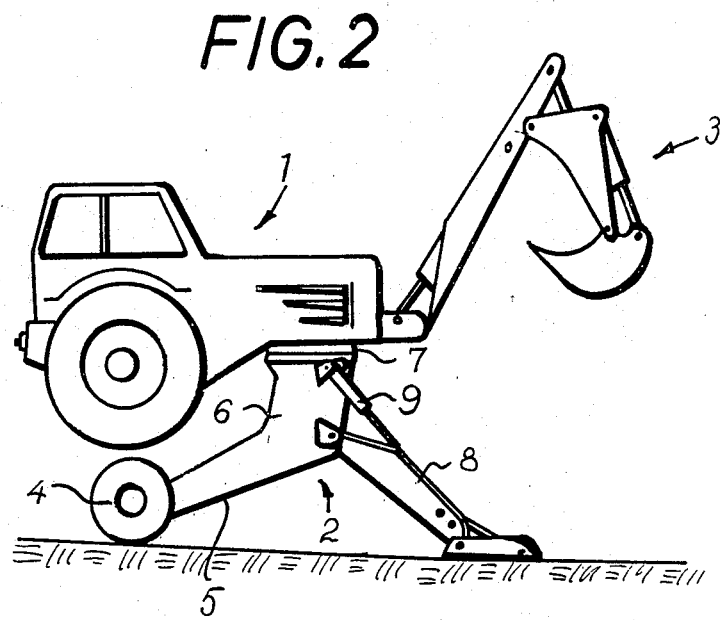

Although the length of link 9 has been somewhat exaggerated in FIGURE 1 to simplify the drawing, it will be readily understood that a proper operation of actuators 13 will permit of imparting to the shaft 2 a circular movement about the pivot pins 10 and that this shaft will at the same time oscillate under the control links 5 inclining more or less the teeth 3 as well as the set of teeth 1 rigid with shaft 2, so that the tips of teeth 1 and 3 will describe a closed-circuit path of general elliptic or circular configuration depending on the relative arrangements of the two sets of links 5 and 9 and on the lengths thereof.

In the example illustrated, the two lateral walls 7 are braced by a bar 16 disposed within a hollow shaft 160 carrying teeth 17 alternating in the transverse direction with the teeth 1 and 3 to constitute a kind of comb through which the teeth 1 and 3 can rise at the end of the harrow delivery movement. The example illustrated permits the movements of teeth 17 when shaft 160 is oscillated under the control of lateral actuators 161 suspended from the walls 7 and anchored to the end teeth 17 by means of forks 162.

When the links 9 are disposed vertically upwards (FIGURE 2), shaft 2 is in its uppermost position and the teeth 1 and 3 free completely the lower portion of the hopper formed between the walls 7, the bottom 18 of this hopper merging into the bottom 19 of the main container or body 20. In FIGURES 2 to 6 of the drawings the reference numeral 21 designates the junction plane between the rear door 22 of the hopper to the body 20, and 23 denotes diagrammatically a transverse partition of the rear door above the bar 16. It is clear that the actuator cylinder can rotate angularly and freely in a vertical plane through a pair of passages 23a formed on either side of said partition 23. If the actuators are caused to move the lower links 9 away from the position shown in FIGURE 2, the shaft 2 will rotate backwards about the pivot pins 10 and if the links 5 are approximately in the position illustrated they will be lowered slightly to the rear while retaining, however, in a forward position the upper ends of teeth 3 which will move to the rear but to a lesser extent than shaft 2, whereby both sets of teeth 1 and 3 will oscillate backwards as they are directed into the mass of products or refuse poured into the hopper, so as to push these products or refuse backwards as shown in FIGURE 3. During this penetration phase the movable device exerts a kind of precompression on the bulky and compressible refuse such as small crates, boxes, etc.

Continuing the movement of rotation of links 9 under the proper control of the aforesaid actuators will subsequently cause the teeth to be lowered and brought forwards so that their tips will describe an arc descending towards the bottom of the hopper 18, and FIGURE 4 shows a position obtaining slightly before the lowermost position, the teeth approaching a vertical position since the upper ends of teeth 3 have been retained backwards by the action of links 5. The harrow will sweep the bottom of the hopper but without producing any frictional contact between the movable device and the bottom and side walls of the hopper.

Now continuing the rotation of links 9 from the position shown in FIGURE 4 will raise the teeth 1 and 3 and restore them to their rear position, while these teeth assume a forward inclination due to the retaining action exerted by the links 5 on the upper end of the teeth, so that the harrow will move to position 5 from which the previously pushed refuse or other products are now forced into the main body 20 while being strongly compressed due to their passage under the teeth 17 and also the reaction of the previously loaded products or refuse, The teeth 17 act as baffle means to cause the products or refuse to penetrate into the body or container beneath these teeth 17 and to subsequently rise within the body while being retained behind these teeth to which a suitable inclination is imparted by means of actuator 161. These teeth 17 are also effective to shear the products forced thereby. It will be noted that the forward inclination of these teeth will facilitate the compression of the products or refuse within the body. The inclination of the teeth 17 may be controlled before and during the harrow movement.

From the position shown in FIGURE 5, the harrow teeth continue to move forwards by rising when the links 9 continue their rotation controlled by the actuators, to the foremost position in which they are shown in FIGURE 6, where they alternate with the teeth 17. As they rise through this comb-like assembly 17 the movable teeth are freed of any refuse still present therebetween, and the teeth 17 of the fixed or movable comb are subsequently cleaned by the harrow teeth 1 and 3.

Continuing the rotation of links 9 will further raise the movable teeth from the position shown in FIGURE 6 as the shaft 2 begins to move backwards and upwards. During this movement of shaft 2 the links 5 are raised and retain forwards the upper end of teeth 3, so that the movable teeth rotate backwards to a vertical position to resume the initial position shown in FIGURE 2 in which they are ready to sink backwards and repeat the above-described cycle.

The device of this invention operates without any frictional contact between the movable members and the fixed portions within the mass of products or refuse being loaded, and the movable teeth do not contact the bottom of the hopper so that no sealing means are required between the delivery members and the hopper. On the other hand, mechanical stresses are minimized due to the floating mounting of pivot pins 6 and 10 permitting a certain angular variation in the position of shaft 2. This floating mounting permits of limiting any effort likely to be attended by distortion of the movable device and/or the receiving hopper. The links 9 actuated by their piston-and-cylinder units can clear their dead center positions due to a certain relative shifting between the links 9 mounted on either side of the hopper, and facilitated by the floating mounting of pivot pins 6 and 10.

The rear door may be locked at its lower edge as shown in FIGURE 8 by means of lateral hooks 24 pivoted on pins 25 of said doors and adapted to engage a stud 26 carried by the lower portion of the hopper. Each lateral hook can be actuated manually by means of a bell crank lever 27 fulcrumed on a pivot pin 28 of said door and provided with an arm 29 pivoted at 30 on a link 31, this arm 29 being pivoted in turn at 32 on the heel of hook 24. If desired this manual control device may be replaced by any suitable hydraulic, pneumatic or electrical control system.

Referring now to FIGURE 7, it will be seen that to open the rear door by using the same actuators 12 and 13, the movable device can be locked against motion by means of a detachable and temporary stud 33 engaged under each link 9 and disposed at the front thereof; after the door has been unlocked by opening the hooks 24, the actuators are operated to move the links 9 which then carry along the door by pivoting same about the pivot pin 34 by which its upper portion is pivotally connected to the body 20. These actuators (or piston-cylinder units) can be controlled through any suitable and known means. The stud 33 may engage a socket provided to this end in each lateral wall 7, but if desired a stud 33 may be provided on each side. The manual control of stud 33 may be replaced by any suitable hydraulic, pneumatic or electrical control system also adapted to control the door release.

The body can be discharged by dumping same or by pivoting a movable front wall 35 controlled by an actuator 36 as shown diagrammatically in FIGURE 7.

FIGURES 9 and 10 illustrate a floating mounting applicable to pivot pins 6 and 10 and comprising a pin 10 disposed through an elongated aperture 37 formed in wall 7 and adapted to be supported externally by an eye formed in a spring blade 38 having its opposite end clamped between two brackets 39 secured to the outer surface of wall 7. Although a floating mounting providing a vertical movement is shown in FIGURES 9 and 10, a mounting providing a flexible movement in a different direction in a vertical longitudinal plane may also be used for the same purpose. Of course, other type of floating mountings may be designed without departing from the spirit and scope of the invention.

In the alternate form of embodiment illustrated in FIG. 11 the harrow consists of a set of teeth 40 substantially similar to the teeth 1 of FIGURE 1 and rigid with a shaft 41 having its ends rotatably mounted in tubular sockets 42 secured to the free ends of the upper links 43 adapted to pivot freely about fixed pins 44 rigid with the lateral walls 45 of the rear door of the body. Pivoted on each socket 42 is one end of a lateral link 46 having its opposite end pivoted on a pin 47 carried by the end of a lateral driving link 48 to which a continuous movement of rotation is imparted by a rotary driving shaft rigid with said link 48.

The closed-circuit movement accomplished by the harrow is caused by the continuous rotation of the driving links 48 actuated by a hydraulic motor 50 housed in the central upper portion of the rear door of the body. The motion is transmitted from the hydraulic motor to the lateral driving links 48 by means of lateral roller chains 51 passing over sprockets 52 secured to the ends of shafts 49 and over the other sprockets 53 keyed to the ends of a transverse shaft 54 mounted in the vicinity of the hydraulic motor 50. Another sprocket 55 keyed to the central portion of shaft 54 is connected by another roller chain 56 to a sprocket 57 keyed to the end of the output shaft of said hydraulic motor 50.

In this example the transmission mechanism is completely isolated from the products or refuse contained in the hopper, as the chains 51 and sprockets 52 are disposed near the outer faces of walls 45, while shaft 54, chain 56 and sprockets 55 and 57 are disposed at a relatively high level.

Alternately, the shafts 49 carrying the driving links 48 may be rotated by means of a direct coupling thereof with a hydraulic motor disposed in the lower portion of the rear door of the body.

The mechanism controlling the closed-circuit movement of the harrow, which comprises the set of links 43 and 48, is adapted to modify the kinematic arrangement producing the operative stroke of said harrow by simply varying the length of said links, and/or the positions of the pins 44 and 49 about which said links rotate, etc., as shown in FIGURES 11, 12, 13 and 14. In FIGURE 11, it is assumed that the arrangement of links 43 is such that these revolve continuously about their respective pivot pins 44, whereby the kinematic arrangement of the links will provide an elliptic circuit having its major axis disposed vertically, an advantageous solution when it is desired to reduce the movement of this harrow in the longitudinal direction. In contrast thereto, in FIGURES 12 to 14 of the drawings it is assumed that the links 43 are adapted to oscillate through an angle γ, so that the circuit followed by the lower tips of the harrow teeth is an ellipse having its major axis disposed horizontally.

To increase the capacity of the harrow to carry along the products or refuse poured into the hopper, auxiliary means for actuating the teeth 40 of this harrow are provided for producing an additional movement of these teeth when the harrow is in its lowermost position with the teeth deeply engaged into the mass of products or refuse in the hopper. These means may comprise for example a hydraulic actuator 60 having its cylinder pivotally connected at 61 to the link 46, and its piston rod pivotally connected to the end of a lever 62 secured to the shaft 41 carrying the teeth 40 of the harrow, as shown. Operating the actuators 60 will rotate the shaft 41 in sockets 42. It will be noted that when the rod of actuator 60 is in its fully retracted position as shown in FIGURE 11, the teeth 40 are aligned with the lateral links 46, and that the outward movement of this rod will cause the same teeth 40 to rotate towards the interior of the body.

When the harrow is sunk into the products contained in the hopper, the actuators 60 are operated to raise the teeth 40. At the end of this downward movement of the harrow these teeth 40 are moved to their remotest position from the plane of the lateral links 46. When, due to the rotation of links 48 and 43, the harrow is moved backwards, the piston rods of actuators 60 are gradually retracted into the relevant cylinders so that when the harrow approaches the inlet end of the body the teeth 40 are substantially in alignment with said lateral links 46.

Moreover, in order to shear the products and simultaneously clean the teeth 63 constituting in this case a fixed comb at the inlet end of the body, another set of fixed teeth 65 may be provided in the bottom 64 of the hopper, these fixed teeth 65 alternating with the teeth 40 for retaining the products at the inlet end of the body when the teeth 40 are raised after having delivered the products into said body, provided however that this additional retaining is deemed necessary.

In an alternate form of embodiment illustrated in FIGURE 15, the harrow comprises teeth 69, similar to those described hereinabove, mounted on at least two shafts 70 and 71 disposed on a common axis. Each shaft constitutes a separate unit connected to the adjacent unit by means of a distance-piece 72 disposed beneath said common axis and secured at its ends to the pair of adjacent end teeth of shafts 70 and 71, as shown. The outer end of a piston rod 73 emerging from a central hydraulic actuator 79 is pivotally connected to the distance-piece 72.

The outer end of each shaft 70, 71 is pivotally connected to one end of a link 74. Each link 74 comprises a projection 75 constituting an abutment adapted to engage a stop 76 formed on the upper portion of the adjacent tooth 69. The opposite end of each link 74 is pivotally mounted in the adjacent lateral wall 45 of the hopper, about a fixed pivot pin 80. The amplitude of the movement accomplished by the link 74 about the fixed pivot pin 80 is controlled by a pair of stops 77 and 78 welded to the lateral wall 45 of the hopper, thus providing two limit positions of said link 74.

The four-cycle closed-circuit movement imparted to the harrow is controlled by the hydraulic actuator 79 equipped with adequate reversing means. FIGURES 16 and 17 illustrate the limit positions of links 74 and of the harrow at the beginning and at the end of the first cycle during which the links 74 firstly engaging the lower stops 78 pivot about the fixed fulcrum 80 until they engage the upper stops 77 while the teeth 69 firstly pivot about the pivot pin 81 due to the traction exerted by the actuator 79 at 72, until the abutment 76 engages the projection 75 and subsequently carry along the links 74. Reversing the direction of movement of the actuator (position shown in FIG- URE 17) will produce the second cycle during which the teeth 69 of the harrow are urged against the link 74 (FIGURE 18), whereafter the links 74 are carried along during the third cycle from their uppermost position to the lowermost position until they engage again the lower stop 78 (FIGURE 19) at the end of this third cycle. Continuing the operation of actuator 79 will then move the teeth 69 away from the links 74 so that these teeth 69 begin to sweep the bottom of the hopper. When the teeth 69 resume a substantially vertical position, i.e. when the stop 76 engages the projection 75 at the end of the fourth cycle, as shown in FIGURE 16, the direction of movement of the actuator is reversed again and the operation of the device is repeated according to the first cycle as described hereinabove.

This particularly simple and economical form of embodiment of the loading device of this invention is suitable notably for apparatus or vehicles of relatively reduced dimensions, as the control system produces a movement of relatively great amplitude of the harrow with respect to the relatively small angle of rotation of the links 74.

Figure 20:
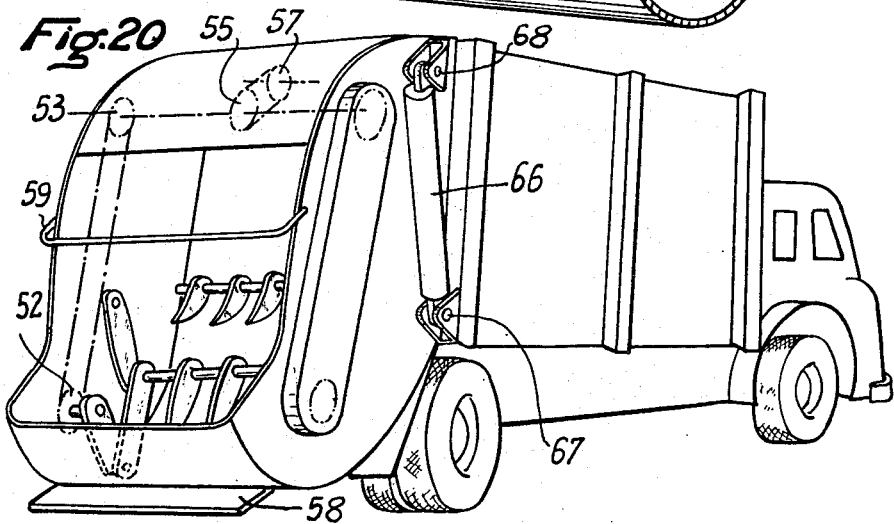
FIGURE 20 is a general perspective view of a refuse-collection or garbage-hauling vehicle wherein the rear door is controlled by piston-and-cylinder actuators independent of those controlling the loading operation.

To illustrate a general view of a form of embodiment according to one of the above-described examples, FIGURE 20 shows diagrammatically a refuse collection vehicle equipped with a loading device corresponding substantially to the arrangement of FIGURE 11. It will be noted that the rear door is adapted to be opened by means of lateral actuators 66 fulcrumed at 67 on the frame structure of the vehicle and at 68 to the upper portion of said door. Moreover, a platform 58 is provided for supporting the operators of the vehicle, who can also hold on the handbar 59 disposed at a suitable level to avoid any interference with the discharge of bins and the like into the hopper.

Although a plurality of forms of embodiment have been illustrated and described, it will be readily understood, various changes in the form and relative arrangements of the parts may be made to suit requirements.

What I claim is:
1. Device for the continuous or intermittent loading of products or refuse into a fixed or movable tank or container, which comprises a loading hopper secured to said container, a movable loading member disposed in said loading hopper, said movable loading member consisting of a harrow carrying teeth, suspended from the upper portion of said hopper, means for imparting a continuous movement to said harrow along a closed circuit within said hopper so as to cause said harrow to plunge into the products already contained in the hopper and to subsequently move said harrow towards said container for delivering thereto the products to be loaded and raising said harrow at the end of said delivery movement and resuming its upper position for repeating the loading cycle including at least one lateral actuator pivotally connected to said container, floating pivot pins flexibly mounted on the lateral walls of the hopper, links pivotally connected to said pins, said actuator and said harrow, and said links being arranged to cause said harrow to follow the desired closed circuit path and a comb constituting a deflector at the inlet of said container for shearing and compressing the products and having spaced apart teeth positioned for the passage therebetween of the teeth of said harrow upon the upward movement thereof whereby said comb is adapted to clean the harrow and comb by interaction.

2. Device as claimed in claim 1 wherein a set of fixed teeth are disposed in the bottom of the hopper ahead of the container.

3. Device as claimed in claim 1 including a rotary link, an actuator for moving said rotary link, a swinging link, said rotary link and swinging link supporting either end of said harrow, said swinging link being adapted to retain said harrow in one or the other direction to incline the lower ends of the teeth of said harrow backwards during the downward movement of said harrow, and forwards at the end of its delivery stroke and during the upward movement of said harrow.

4. Device as claimed in claim 1 wherein hydraulic actuators independent of the means controlling the continuous movement of the harrow along said closed circuit path, are connected to said teeth for moving said teeth in relation to the axis of said harrow following a closed circuit path during the dipping of said harrow into the products contained in the hopper.

5. Device for the continuous or intermittent loading of products or refuse into a fixed or movable tank or container, which comprises a loading hopper secured to said container, a movable loading member disposed in said loading hopper, said movable loading member consisting of a harrow carrying teeth, suspended from the upper portion of said hopper, means for imparting a continuous movement to said harrow along a closed circuit within said hopper so as to cause said harrow to plunge into the products already contained in the hopper and to subsequently move said harrow towards said container for delivering thereto the products to be loaded, and raising said harrow at the end of said delivery movement and resuming its upper position for repeating the loading cycle including a swinging link supporting said harrow and adapted to move along a predetermined circular arc, stops limiting the movement of said link, and a centrally disposed actuator adapted to impart a complementary swinging movement to said harrow, a comb constituting a deflector at the inlet of said container for shearing and compressing the products and having spaced apart teeth positioned for the passage therebetween of the teeth of said harrow upon the upward movement thereof whereby said comb is adapted to clean the harrow and comb by interaction.

6. Device as claimed in claim 5, wherein said harrow includes a shaft with said teeth supported by said shaft, said actuator reacts against a point disposed between two adjacent teeth of said harrow at a lower level of said teeth than that of said shaft supporting said teeth.

References Cited
UNITED STATES PATENTS

| 2,627,988 | 2/1953 | Thomas et al. | 214—83 |
| 2,649,216 | 8/1953 | Gollnick | 214—83.3 |
| 2,692,062 | 10/1954 | Calamore | 214—83.3 XR |
| 2,939,594 | 6/1960 | Gwinn | 214—503 |
| 3,297,180 | 1/1967 | Park et al. | 214—83.3 |
| 3,280,994 | 10/1966 | Herpich et al. | 214—83.3 |
| 3,389,821 | 6/1968 | Weichel | 214—83.3 |

ALBERT J. MAKAY, Primary Examiner

U.S. Cl. X.R.

100—97; 198—229

March 10, 1970 — E. PEDERSEN — 3,499,559
MOBILE AND TURNABLE DIGGING MACHINE, CRANE OR THE LIKE
Filed Aug. 30, 1967 — 3 Sheets-Sheet 1

INVENTOR
EGIL PEDERSEN
BY
ATTORNEYS